United States Patent
Zhao et al.

(10) Patent No.: US 10,915,192 B2
(45) Date of Patent: Feb. 9, 2021

(54) METHOD FOR DRIVING DISPLAY PANEL, DISPLAY PANEL AND DISPLAY DEVICE

(71) Applicants: Chongqing BOE Optoelectronics Technology Co., Ltd., Chongqing (CN); BOE Technology Group Co., Ltd., Beijing (CN)

(72) Inventors: Jingpeng Zhao, Beijing (CN); Jieqiong Wang, Beijing (CN); Zhi Zhang, Beijing (CN); Guangquan Wang, Beijing (CN); Xiang Wang, Beijing (CN); Panpan Li, Beijing (CN); Yanfei Yan, Beijing (CN); Xiuzhu Tang, Beijing (CN); Shuai Chen, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/404,893

(22) Filed: May 7, 2019

(65) Prior Publication Data
US 2020/0033977 A1    Jan. 30, 2020

(30) Foreign Application Priority Data
Jul. 26, 2018   (CN) .......................... 2018 1 0832609

(51) Int. Cl.
*G09G 3/36* (2006.01)
*G06F 3/041* (2006.01)
(Continued)

(52) U.S. Cl.
CPC .......... *G06F 3/0412* (2013.01); *G02F 1/1343* (2013.01); *G02F 1/13338* (2013.01);
(Continued)

(58) Field of Classification Search
USPC ... 345/173, 174, 212, 694, 103, 215, 96, 88, 345/98, 87, 213, 204, 55, 92, 214, 209
See application file for complete search history.

(56) References Cited

U.S. PATENT DOCUMENTS

2005/0078075 A1* 4/2005 Joo ...................... G09G 3/3688
                                                    345/96
2007/0164954 A1* 7/2007 Yang ................... G09G 3/3677
                                                    345/88
(Continued)

*Primary Examiner* — Thuy N Pardo
(74) *Attorney, Agent, or Firm* — Arent Fox LLP; Michael Fainberg (57) ABSTRACT

A method for driving a display panel, a display panel, and a display device are provided. The display panel includes: a first gate driver circuit, a second gate driver circuit, common electrodes in an array, data lines, and gate lines, where the gate lines include first and second gate lines alternately row by row in the extension direction of the data lines, the first gate driver circuit is connected with the first gate lines, the second gate driver circuit is connected with the second gate lines, and the common electrodes are reused as touch electrodes; and in one frame, a gate scan signal or an alternating-current touch scan signal is input respectively to the first gate lines and the second gate lines in different periods so that a display function can be enabled, but also a touch report rate can be improved.

11 Claims, 7 Drawing Sheets

(51) Int. Cl.
*G02F 1/1333* (2006.01)
*G02F 1/1343* (2006.01)

(52) U.S. Cl.
CPC ....... *G06F 3/04164* (2019.05); *G09G 3/3674* (2013.01); *G09G 2310/0264* (2013.01)

(56) References Cited

U.S. PATENT DOCUMENTS

| | | | |
|---|---|---|---|
| 2007/0164964 A1* | 7/2007 | Ha | G09G 3/3607 345/98 |
| 2008/0024418 A1* | 1/2008 | Kim | G09G 3/3648 345/98 |
| 2009/0040202 A1* | 2/2009 | Park | G09G 3/3614 345/204 |
| 2009/0189839 A1* | 7/2009 | Ko | G09G 3/3648 345/87 |
| 2010/0073354 A1* | 3/2010 | Kim | G09G 3/3674 345/213 |
| 2012/0056858 A1* | 3/2012 | Ahn | G09G 3/3677 345/204 |
| 2012/0162185 A1* | 6/2012 | Park | G09G 3/3611 345/212 |
| 2013/0127817 A1* | 5/2013 | Hwang | G09G 3/348 345/212 |
| 2013/0229401 A1* | 9/2013 | Kim | G06F 3/042 345/212 |
| 2013/0307758 A1* | 11/2013 | Kim | G09G 3/3648 345/55 |
| 2014/0002334 A1* | 1/2014 | Jung | G09G 3/3677 345/92 |
| 2014/0071066 A1* | 3/2014 | Lee | G06F 3/0412 345/173 |
| 2015/0145852 A1* | 5/2015 | Ahn | G09G 3/3677 345/214 |
| 2015/0194112 A1* | 7/2015 | Koo | G09G 3/3677 345/92 |
| 2015/0243212 A1* | 8/2015 | Lee | G09G 3/3225 345/212 |
| 2016/0005351 A1* | 1/2016 | Jeon | G09G 3/2085 345/204 |
| 2016/0019852 A1* | 1/2016 | Kim | G09G 3/3677 345/103 |
| 2016/0035302 A1* | 2/2016 | Sun | G09G 3/3614 345/209 |
| 2016/0189655 A1* | 6/2016 | Choi | G09G 3/3674 345/215 |
| 2016/0253946 A1* | 9/2016 | Park | G09G 3/36 345/694 |

* cited by examiner

METHOD FOR DRIVING DISPLAY PANEL, DISPLAY PANEL AND DISPLAY DEVICE

CROSS-REFERENCES TO RELATED APPLICATION

This application claims priority to Chinese patent application No. 201810832609.3 filed on Jul. 26, 2018, which is incorporated herein by reference in its entirety.

FIELD

The present disclosure relates to the field of touch display technologies, and particularly to a method for driving a display panel, a display panel, and a display device.

BACKGROUND

With the rapid development of the display technologies, a touch display panel integrated both a touch function and a display function has been gradually widespread in our life, so the research has been focused on how to drive the display panel to enable the touch function and the display function without affecting each other.

In the related art, in one scheme, the touch function is only enabled in a non-display area so that the touch function and the display function may not affect each other, but there is a low touch report rate, and a large number of touches are reported in a specific period of time; in another scheme, the touch function is enabled in both a display area and a non-display area of the display panel, so there is a high touch report rate, and touches are reported uniformly in different periods of time, but the touch function and the display function may affect each other.

Accordingly it is highly desirable for those skilled in the art to alleviate the touch function and the display function from affecting each other while improving the touch report rate of the touch display panel.

SUMMARY

In one aspect, an embodiment of the disclosure provides a method for driving a display panel. The display panel includes: a first gate driver circuit, a second gate driver circuit, common electrodes in an array, data lines, and gate lines, wherein the gate lines include first gate lines and second gate lines alternately row by row in an extension direction of the data lines, the first gate driver circuit is connected with the first gate lines, the second gate driver circuit is connected with the second gate lines, the first gate driver circuit and the second gate driver circuit output signals alternately, and the common electrodes are reused as touch electrodes; and one frame includes a first period and a second period. The method includes: in the first period, providing, by the first gate driver circuit, a gate scan signal to the first gate lines row by row, and providing, by the second gate driver circuit, an alternating-current touch scan signal to the second gate lines row by row; and in the second period, providing, by the first gate driver circuit, the alternating-current touch scan signal to the first gate lines row by row, and providing, by the second gate driver circuit, the gate scan signal to the second gate lines row by row; wherein in the first period and the second period, the alternating-current touch scan signal is provided to the common electrodes, and data signals are provided to the data lines, and the alternating-current touch scan signal and the data signals are switched between positive and negative polarities at a same frequency.

In a possible implementation, in the method above for driving the display panel according to the embodiment of the disclosure, one frame further includes a third period between the first period and the second period, the method further includes: in the third period, providing a first alternating-current touch signal to the first gate lines, the second gate lines, and the data lines, and providing a second alternating-current touch signal to the common electrodes.

In a possible implementation, in the method above for driving the display panel according to the embodiment of the disclosure, one frame further includes a fourth period after the second period, the method further includes: in the fourth period, providing the first alternating-current touch signal to the first gate lines, the second gate lines, and the data lines, and providing the second alternating-current touch signal to the common electrodes.

In a possible implementation, in the method above for driving the display panel according to the embodiment of the disclosure, the second alternating-current touch signal provided to the common electrodes is different from the first alternating-current touch signal provided to the first gate lines, the second gate lines, and the data lines.

In a possible implementation, in the method above for driving the display panel according to the embodiment of the disclosure, the frequency of the second alternating-current touch signal provided to the common electrodes is lower than the frequency of the first alternating-current touch signal provided to the first gate lines, the second gate lines, and the data lines.

In a possible implementation, in the method above for driving the display panel according to the embodiment of the disclosure, in the third period and/or the fourth period, the second alternating-current touch signal provided to the common electrodes is the same as the first alternating-current touch signal provided to the first gate lines, the second gate lines, and the data lines.

In another aspect, an embodiment of the disclosure further provides a display panel for performing the method above according to any one of the embodiments above. The display panel includes: a first gate driver circuit, a second gate driver circuit, common electrodes in an array, data lines, and gate lines, wherein the gate lines include first gate lines and second gate lines alternately row by row in an extension direction of the data lines, the first gate driver circuit is connected with the first gate lines, the second gate driver circuit is connected with the second gate lines, the first gate driver circuit and the second gate driver circuit output signals alternately, and the common electrodes are reused as touch electrodes; wherein in a first period of one frame, the first gate driver circuit is configured to provide a gate scan signal to the first gate lines row by row, and the second gate driver circuit is configured to provide an alternating-current touch scan signal to the second gate lines row by row; and in a second period of one frame, the first gate driver circuit is configured to provide the alternating-current touch scan signal to the first gate lines row by row, and the second gate driver circuit is configured to provide the gate scan signal to the second gate lines row by row; wherein in the first period and in the second period, the alternating-current touch scan signal is provided to the common electrodes, and data signals are provided to the data lines, and the alternating-current touch scan signal and the data signals are switched between positive and negative polarities at a same frequency.

In a possible implementation, in the display panel above according to the embodiment of the disclosure, the display panel is a light-emitting diode display panel including cathode layers in an array, which are reused as the touch electrodes.

In a possible implementation, in the display panel above according to the embodiment of the disclosure, the display panel is a liquid crystal display panel including common electrodes in an array, which are reused as the touch electrodes.

In a possible implementation, in the display panel above according to the embodiment of the disclosure, voltage differences between the alternating-current touch scan signal and two data signals provided to two adjacent data lines at a same instance of time are opposite in polarity.

In another aspect, an embodiment of the disclosure further provides a display device including the display panel in any one of the implementations above.

DETAILED DESCRIPTION

Figure 1:
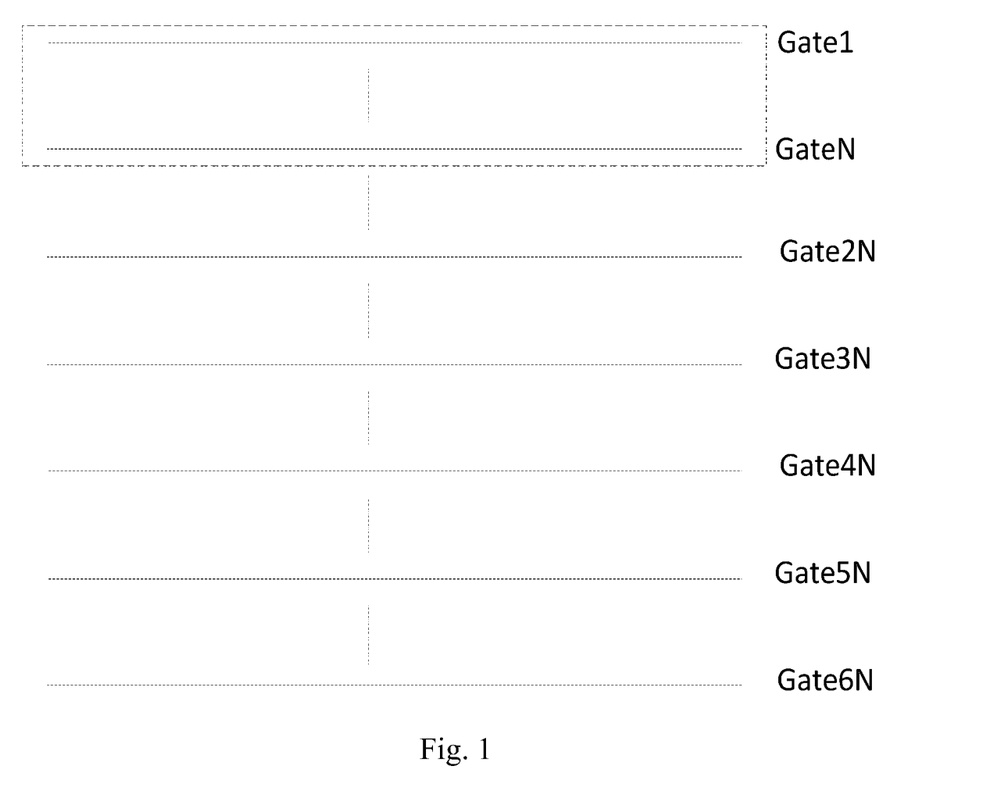
FIG. 1 is a schematic structural diagram of a display panel in the related art, which is divided into areas.
Figure 2:
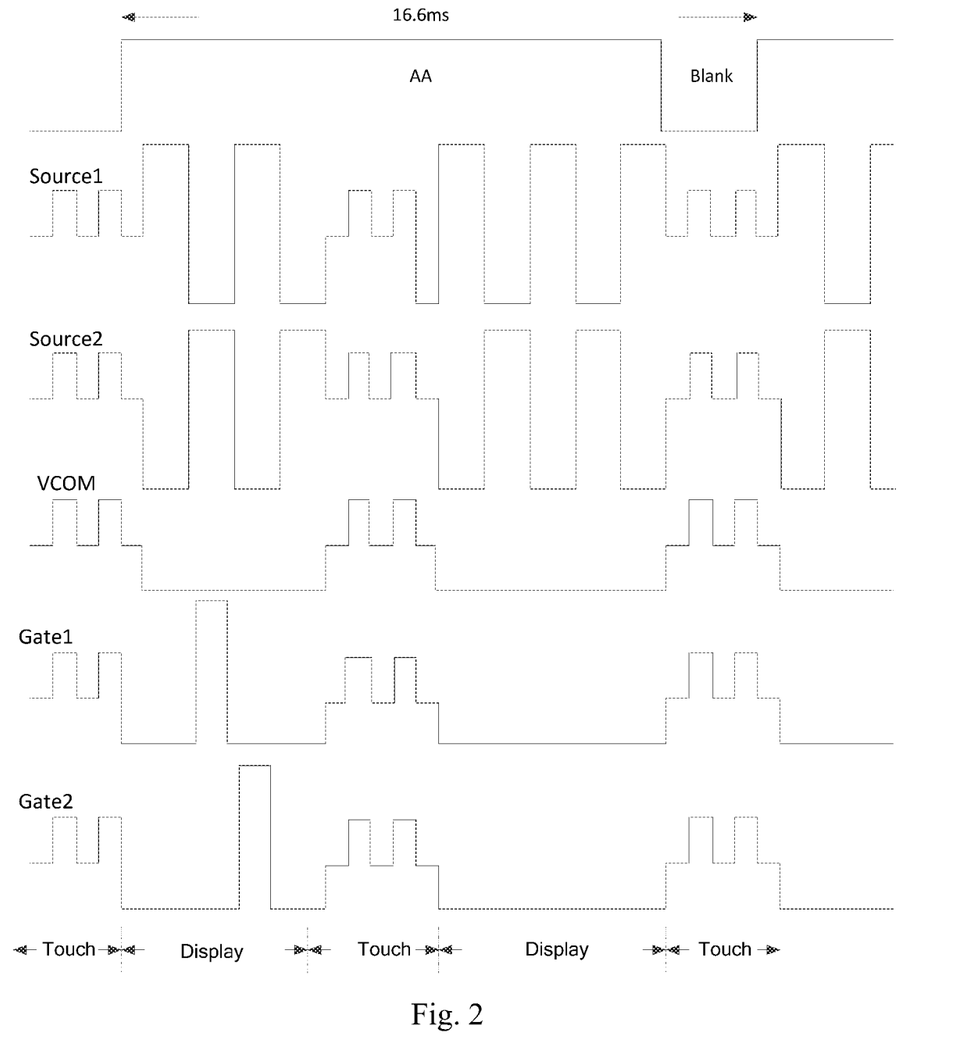
FIG. 2 is a timing diagram of a method for driving the display panel as illustrated in FIG. 1.

In order to detect a touch in both the display area and a non-display area of the display panel so as to improve the touch report rate, as illustrated in FIG. 1 and FIG. 2, the display function and the touch function are driven in a time division mode in the display area AA, and only the touch function is enabled in the blank area Blank, in one frame (in 16.6 ms). The display area AA is divided into a plurality of sub-areas, each of which includes N gate lines, only the touch function but not the display function is enabled after the display function is completed in each sub-area and before the display function is enabled in the next sub-area, and the display function is enabled in the next sub-area only after the touch function is completed. Since common electrodes are reused as touch electrodes in the display panel, when the display function is enabled in each sub-area (in a display period), a direct-current signal (Vcom) is provided to the touch electrodes corresponding to the sub-areas to thereby perform the display function; and when the touch function is enabled in each sub-area (a touch period), an alternating-current signal (Vcom) is provided to the touch electrodes corresponding to the sub-area as a feedback waveform for detecting a touch. In this way, the signal provided to the touch electrodes is switched between the direct-current and alternating-current signals while the display panel is being driven, and while the signal is being switched from the direct-current signal to the alternating-current signal (that is, the display panel is being switched from the display function to the touch function), if a period of time for a response to the switching is not long enough, then the signal may not be switched to the alternating-current signal timely, or a waveform thereof may be seriously delayed, thus hindering a touch from being detected accurately, and degrading the touch precision; and while the signal is being switched from the alternating-current signal to the direct-current signal (that is, the display panel is being switched from the touch function to the display function), the signal may not be changed from the alternating-current signal back to the stable direct-current signal timely, thus degrading the display effect due to occurring horizontal strips.

In view of this, in order to avoid the display function and the touch function from affecting each other in the related art, the embodiments of the disclosure provide a method for driving a display panel, a display panel, and a display device. In order to make the objects, technical solutions, and advantages of the disclosure more apparent, particular implementations of the method for driving a display panel, the display panel, and the display device according to the embodiments of the disclosure will be described below in details with reference to the drawings. As can be appreciated, the preferable embodiments to be described below are only intended to illustrate and explain the disclosure, but not intended to limit the disclosure thereto. Furthermore the embodiments of the disclosure, and the features in the embodiments can be combined with each other unless they conflict with each other.

The shapes and sizes of respective components in the drawings are not intended to reflect any real proportion, but only intended to illustrate the content of the disclosure.

Figure 3:
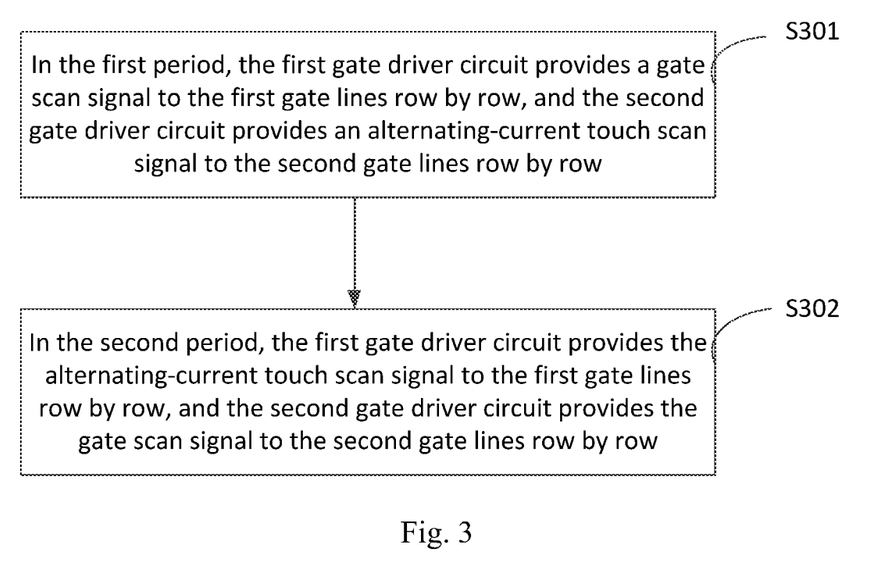
FIG. 3 is a first flow chart of a method for driving a display panel according to an embodiment of the disclosure.

Specifically as illustrated in FIG. 3, an embodiment of the disclosure provides a method for driving a display panel. The display panel includes a first gate driver circuit, a second gate driver circuit, common electrodes arranged in an array, data lines, and gate lines, where the gate lines include first gate lines and second gate lines arranged alternately row by row in the extension direction of the data lines, the first gate driver circuit is connected with the first gate lines, the first gate driver circuit and the second gate driver circuit output signals alternately, the second gate driver circuit is connected with the second gate lines, and the common electrodes are reused as touch electrodes; and one frame includes a first period and a second period.

S301. In the first period, the first gate driver circuit provides a gate scan signal to the first gate lines row by row, and the second gate driver circuit provides an alternating-current touch scan signal to the second gate lines row by row.

S302. In the second period, the first gate driver circuit provides the alternating-current touch scan signal to the first gate lines row by row, and the second gate driver circuit provides the gate scan signal to the second gate lines row by row.

In the first period and in the second period, the alternating-current touch scan signal is provided to the common electrodes, and data signals are provided to the data lines, where the alternating-current touch scan signal and the data signals are switched between the positive and negative polarities at the same frequency.

In the method for driving a display panel according to the embodiment of the disclosure, the display panel includes: a first gate driver circuit, a second gate driver circuit, common electrodes arranged in an array, data lines, and gate lines, where the gate lines include first gate lines and second gate lines arranged alternately row by row in the extension direction of the data lines, the first gate driver circuit is connected with the first gate lines, the first gate driver circuit and the second gate driver circuit output signals alternately, the second gate driver circuit is connected with the second gate lines, and the common electrodes are reused as touch electrodes; and one frame includes a first period and a second period, where in the first period, the first gate driver circuit provides a gate scan signal to the first gate lines row by row, and the second gate driver circuit provides an alternating-current touch scan signal to the second gate lines row by row; and in the second period, the first gate driver circuit provides the alternating-current touch scan signal to the first gate lines row by row, and the second gate driver circuit provides the gate scan signal to the second gate lines row by row, where the alternating-current touch scan signal is provided to the common electrodes, and data signals are provided to the data lines, in the first period and the second period, where the alternating-current touch scan signal and the data signals are switched between the positive and negative polarities at the same frequency. The gate scan signal or the alternating-current touch scan signal is input to the first gate lines and the second gate lines in different periods, so that a display function can be enabled, but also a touch report rate can be improved; and the alternating-current touch scan signal and the data signals are switched between the positive and negative polarities at the same frequency, so that the alternating-current touch scan signal can be provided to the common electrodes all the time without being switched between a direct-current signal and an alternating-current signal, to thereby alleviate a touch function and the display function from affecting each other.

Figure 4:
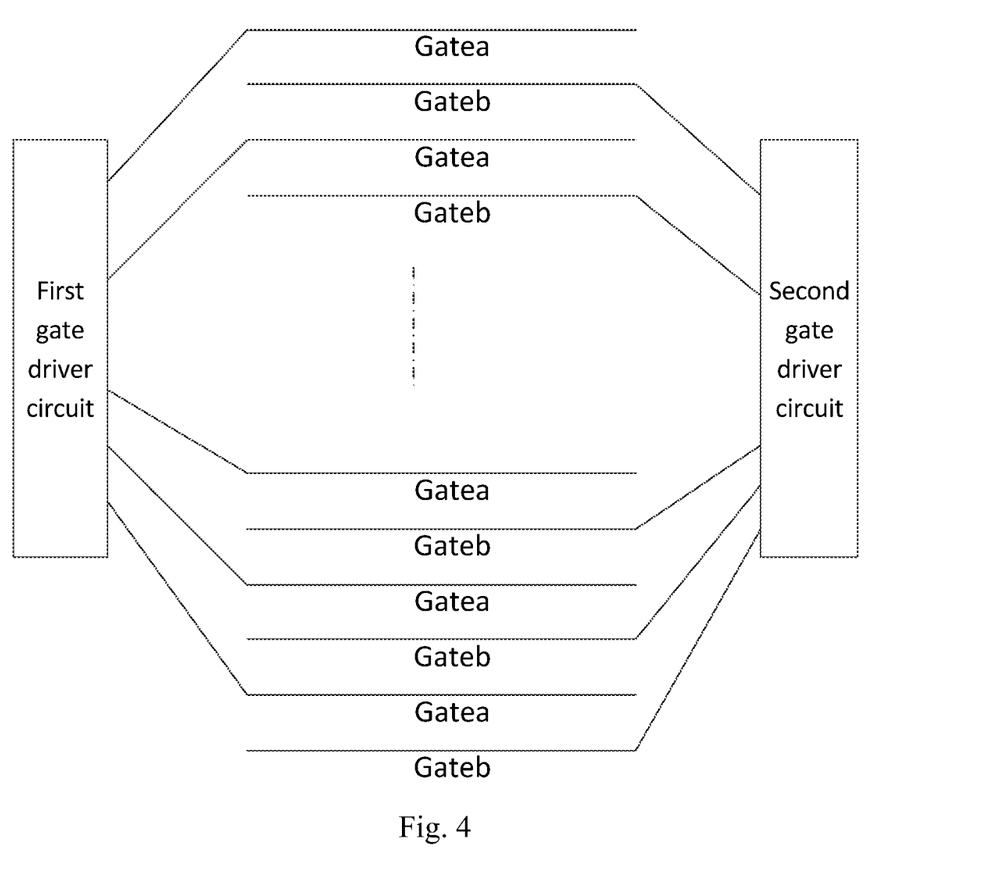
FIG. 4 is a schematic structural diagram of a display panel according to an embodiment of the disclosure.

Here the display panel in the embodiment of the disclosure can be driven bilaterally, and as illustrated in FIG. 4, the display panel includes the first gate driver circuit and the second gate driver circuit. The first gate driver circuit is connected with the first gate lines Gate a, and the second gate driver circuit is connected with the second gate lines Gate b; and the first gate lines Gate a can be gate lines in odd rows, or gate lines in even rows in the display panel, and the second gate lines Gate b can be gate lines in odd rows, or gate lines in even rows, where of course, when the first gate lines Gate a are gate lines in odd rows, the second gate lines Gate b are gate lines in even rows; and when the first gate lines Gate a are gate lines in even rows, the second gate lines Gate b are gate lines in odd rows, where they can be driven under the same principle, particularly as needed in reality, although the embodiment of the disclosure will not be limited thereto.

Specifically in the method above for driving a display panel according to the embodiment of the disclosure, for example, the first gate lines are gate lines in odd rows, and the second gate lines are gate lines in even rows, so a gate scan signal is input to firstly the gate lines in odd rows row by row in the first period, and then the gate scan signal is input to the gate lines in even rows row by row in the second period, so that the entire display panel is scanned for displaying a frame of image. In each period, an alternating-current touch scan signal is input to at least a part of the gate lines not used for display function in the period to thereby enable the touch function in their corresponding areas.

It shall be noted that in the method above for driving a display panel according to the embodiment of the disclosure, the alternating-current touch scan signal provided to the common electrodes is switched between the positive and negative polarities at the same frequency as the data signals provided to the data lines in the first period and the second period, to thereby guarantee a display voltage different between the common electrodes and pixel electrodes. For example, the display function can only be enabled with a 2V voltage difference at some pixel at some instance of time, and voltage at a common electrode in the period is 5V, so voltage at a pixel electrode shall be set to 7V to thereby enable the display function at the pixel. The embodiment above has been and will be described only by way of an example in which pixels in a liquid crystal display panel are driven to display an image, but the principle will also be applicable to an organic light-emitting diode display panel, so a repeated description thereof will be omitted here.

Figure 5:
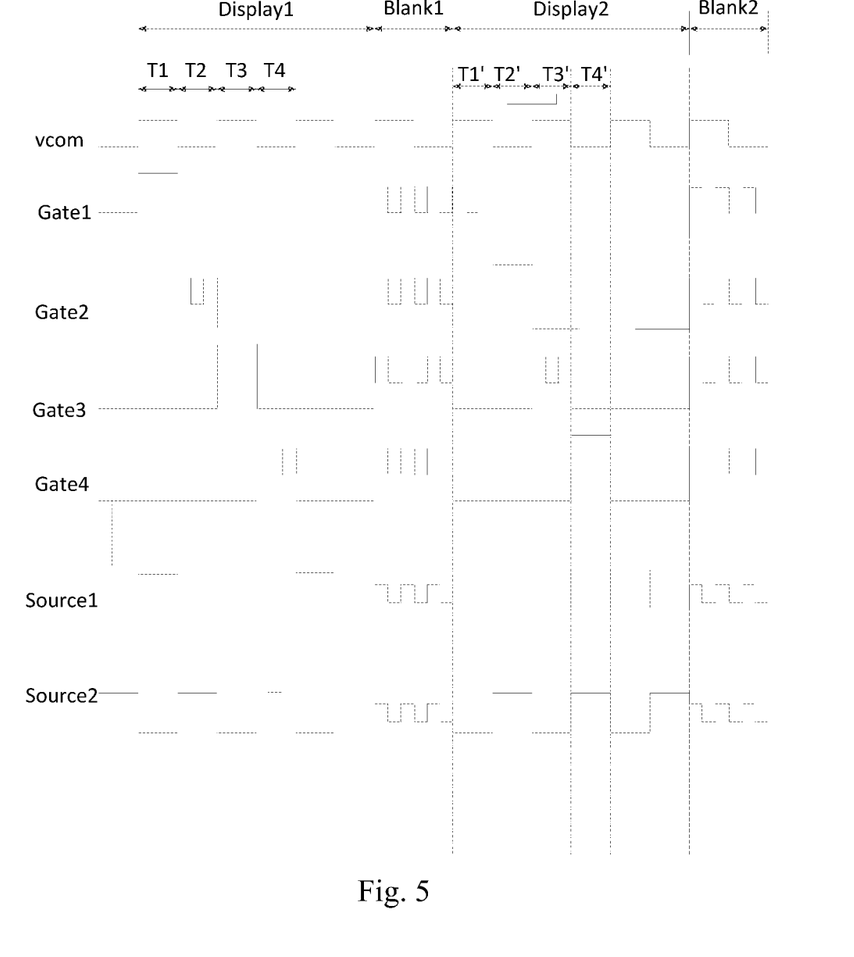
FIG. 5 is a timing diagram of the method for driving a display panel according to the embodiment of the disclosure.

Specifically in the method above for driving a display panel according to the embodiment of the disclosure, with reference to the timing diagram as illustrated in FIG. 5, in the first period Display1, firstly the first gate driver circuit provides a gate scan signal to the gate line Gate1 in the first row in a period T1, then the second gate driver circuit provides an alternating-current touch scan signal to the gate line Gate2 in the second row in a period T2, next the first gate driver circuit provides the gate scan signal to the gate line Gate3 in the third row in a period T3, and the second gate driver circuit provides the alternating-current touch scan signal to the gate line Gate4 in the fourth row in a period T4; and this process is repeated until all the scan lines are scanned so that the display function and the touch function are performed in the first period. In the second period Display2, firstly the first gate driver circuit provides the alternating-current touch scan signal to the gate line Gate1 in the first row in a period T1', then the second gate driver circuit provides the gate scan signal to the gate line Gate2 in the second row in a period T2', next the first gate driver circuit provides the alternating-current touch scan signal to the gate line Gate3 in the third row in a period T3', and the second gate driver circuit provides the gate scan signal to the gate line Gate4 in the fourth row in a period T4'; and this process is repeated until all the scan lines are scanned so that the display function and the touch function are performed in the second period. With this method, a touch can be detected in a half of each of the first period Display1 and the second period Display2 to thereby prolong a period of time for touch reporting.

In some embodiments of the disclosure, in the method above for driving the display panel, the period of time of one frame further includes a third period between the first period and the second period.

In the third period, a first alternating-current touch signal is provided to the first gate lines, the second gate lines, and the data lines, and a second alternating-current touch signal is provided to the common electrodes.

In some embodiments of the disclosure, in the method above for driving the display panel, one frame further includes a fourth period after the second period.

In the fourth period, the first alternating-current touch signal is provided to the first gate lines, the second gate lines, and the data lines, and the second alternating-current touch signal is provided to the common electrodes.

As can be apparent form the embodiment above, as illustrated in FIG. 5, in the third period Blank1 and the fourth period Blank2, the first alternating-current touch signal is provided to all of the first gate lines, the second gate lines, and the data lines, and the second alternating-current touch signal is provided to the common electrodes, where both the first alternating-current touch signal and the second alternating-current touch signal are used for touch, and the third period Blank1 and the fourth period Blank2 are blank periods in which the display function is disabled, so there is a high touch sampling rate in these periods.

In some embodiments of the disclosure, in the method above for driving the display panel, the second alternating-current touch signal provided to the common electrodes is different from the first alternating-current touch signal provided to the first gate lines, the second gate lines, and the data lines.

Specifically in the method above for driving a display panel according to the embodiment of the disclosure, as illustrated in FIG. 5, in order to provide the same signal to the common electrodes in the first period to the fourth period, the signal applied to the common electrodes will not be changed in the different periods, so that in the third period and the fourth period, the second alternating-current touch signal provided to the common electrodes is different from the first alternating-current touch signal provided to the first gate lines, the second gate lines, and the data lines, so the second alternating-current touch signal shall be processed and then compared with the first alternating-current touch signal to thereby perform a touch. Specifically in this case, the second alternating-current touch signal applied to the common electrodes in the third period and the fourth period is the same signal as the alternating-current touch scan signal applied to the common electrodes in the first period and the second period.

In some embodiments of the disclosure, in the method above for driving the display panel, the frequency of the second alternating-current touch signal provided to the common electrodes is lower than the frequency of the first alternating-current touch signal provided to the first gate lines, the second gate lines, and the data lines.

Specifically in the method above for driving the display panel according to the embodiment of the disclosure, as illustrated in FIG. 5, in the third period and the fourth period, the frequency of the second alternating-current touch signal Vcom provided to the common electrodes is lower than the frequency of the first alternating-current touch signal provided to the first gate lines Gatea, the second gate lines Gateb, and the data lines, where the first alternating-current touch signal input to the first gate lines Gatea and the second gate lines Gateb is compared with the second alternating-current touch signal input to the common electrodes (the touch electrodes) to thereby avoid voltage on the other signal lines in the display panel from being coupled with voltage on the touch electrodes, and thus the former voltage from affecting waveforms of the latter voltage, which would otherwise have resulted in misjudgment of a touch which actually had not occurred. The gate lines and data lines are located in the display panel, and are subjected the same influence by the voltage in the display panel, so only the voltage on the touch electrodes but not the signals on the gate lines and the data lines may be affected while a touch is occurring, and in this way, the signals on the touch electrodes are compared with the second alternating-current touch signal on the gate lines, and/or the first alternating-current touch signal on the data lines, to thereby determine the position of the touch so as to improve the accuracy of detecting the touch, where the frequency of the first alternating-current touch signal applied to the gate lines and the data lines is different from the frequency of the second alternating-current touch signal applied to the touch electrodes, so firstly the respective alternating-current touch signals can be converted, and then compared.

In some embodiments of the disclosure, in the method above for driving the display panel, in the third period and/or the fourth period, the second alternating-current touch signal provided to the common electrodes is the same as the first alternating-current touch signal provided to the first gate lines, the second gate lines, and the data lines.

Specifically the display function is disabled in the third period and the fourth period, so the positive or negative polarity of the second alternating-current touch signal applied to the common electrodes may not be the same as that of the data signals for display, so that the frequency of the second alternating-current touch signal provided to the common electrodes in these periods may be the same as the frequency of the first alternating-current touch signal provided to the first gate lines, the second gate lines, and the data lines, and thus the signals can be compared without being converted, to thereby simplify data processing. Stated otherwise, the second alternating-current touch signal applied to the common electrodes in the third period and the fourth period is different from the alternating-current touch scan signal applied to the common electrodes in the first period and the second period, and specifically the frequency of the second alternating-current touch signal provided to the common electrodes in the third period and the fourth period can be higher than the frequency of the alternating-current touch scan signal applied to the common electrodes in the first period and the second period.

Based upon the same inventive idea, an embodiment of the disclosure further provides a display panel for performing the method above according to any one of the embodiments above of the disclosure.

Specifically the display panel includes a first gate driver circuit, a second gate driver circuit, common electrodes arranged in an array, data lines, and gate lines, where the gate lines include first gate lines and second gate lines arranged alternately row by row in the extension direction of the data lines, the first gate driver circuit is connected with the first gate lines, the first gate driver circuit and the second gate driver circuit output signals alternately, the second gate driver circuit is connected with the second gate lines, and the common electrodes are reused as touch electrodes. In the first period of one frame, the first gate driver circuit is configured to provide a gate scan signal to the first gate lines row by row, and the second gate driver circuit is configured to provide an alternating-current touch scan signal to the second gate lines row by row. In the second period of one frame, the first gate driver circuit is configured to provide the alternating-current touch scan signal to the first gate lines row by row, and the second gate driver circuit is configured to provide the gate scan signal to the second gate lines row by row. In the first period and in the second period, the alternating-current touch scan signal is provided to the common electrodes, and data signals are provided to the data lines, where the alternating-current touch scan signal and the data signals are switched between the positive and negative polarities at the same frequency.

Figure 6:
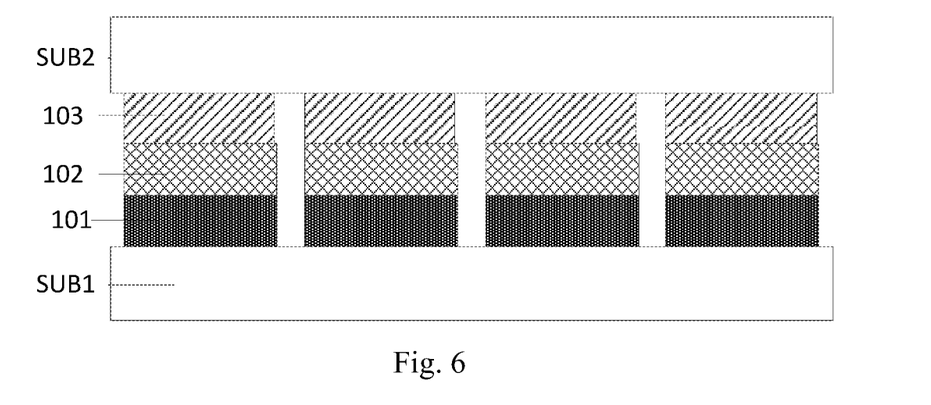
FIG. 6 is a first schematic structural diagram of a display panel according to an embodiment of the disclosure.

In some embodiments of the disclosure, in the display panel above, as illustrated in FIG. 6, the display panel is a light-emitting diode display panel including cathode layers 103 arranged in an array, which are reused as the touch electrodes.

Specifically in the display panel above according to the embodiment of the disclosure, as illustrated in FIG. 6, the light-emitting diode display panel includes an array substrate SUB1, an opposite substrate SUB2, and anode layers 101, light-emitting layers 102, and the cathode layers 103, which are located successively on the side of the array substrate SUB1 facing the opposite substrate, and since the cathode layers 103 are reused as the touch electrodes, the cathode layers are arranged in an array.

Figure 7:
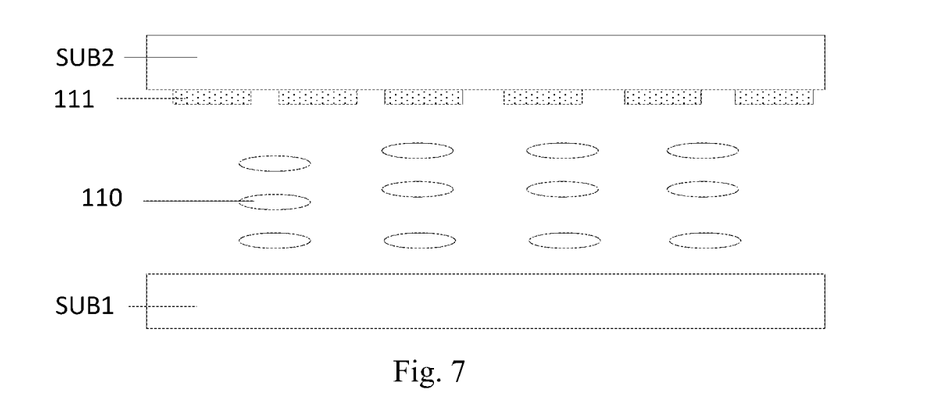
FIG. 7 is a second schematic structural diagram of the display panel according to the embodiment of the disclosure.

In some embodiments of the disclosure, in the display panel above, as illustrated in FIG. 7, the display panel is a liquid crystal display panel including common electrodes 111 arranged in an array, which are reused as the touch electrodes.

Specifically in the display panel above according to the embodiment of the disclosure, as illustrated in FIG. 7, the liquid crystal display panel includes an array substrate SUB1, an opposite substrate SUB2, a liquid crystal layer 110 located between the array substrate SUB1 and the opposite substrate SUB2, and the common electrode layers 111 located on the side of the opposite substrate SUB2 facing the array substrate SUB1, and since the common electrode layers 111 are reused as the touch electrodes, the common electrode layers 111 are arranged in an array.

In some embodiments of the disclosure, in the display panel above, when the display panel is a liquid crystal display panel, data signals provided to two adjacent data lines at the same instance of time are opposite in polarity to a voltage difference arising from the alternating-current touch scan signal.

Specifically in the display panel above according to the embodiment of the disclosure, in order to prevent liquid crystals in the liquid crystal display panel from being polarized while an image is being displayed, and thus hindering the image from being displayed, voltage differences between the alternating-current touch scan signal and two data signals on two adjacent data lines are set opposite in polarity, that is, polarity column inversion, to thereby avoid the liquid crystals from being polarized.

Figure 8:
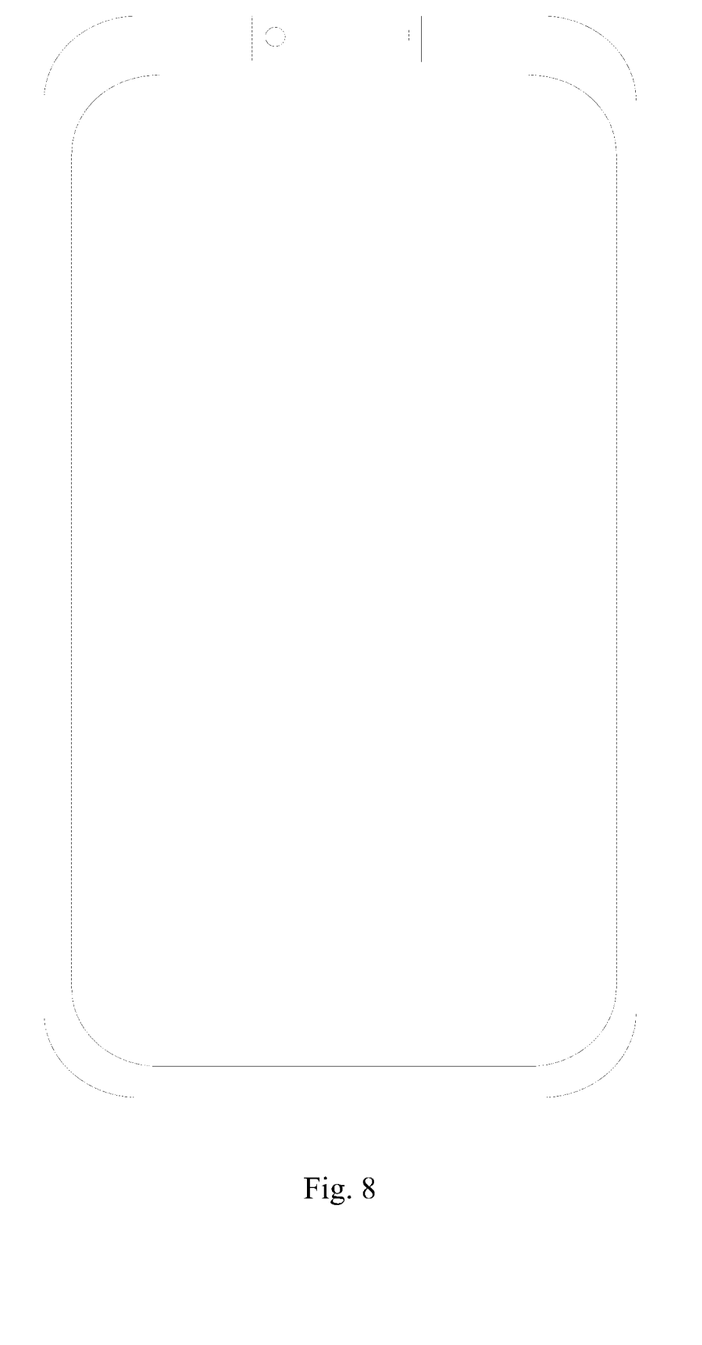
FIG. 8 is a schematic structural diagram of a display device according to an embodiment of the disclosure.

Based upon the same inventive idea, an embodiment of the disclosure further provides a display device as illustrated in FIG. 8 including the display panel above according to the embodiment of the disclosure. The display device can be a mobile phone, a tablet computer, a TV set, a display, a notebook computer, a digital photo frame, a navigator, or any other product or component with a display function. All the other components indispensable to the display device shall readily occur to those ordinarily skilled in the art, so a repeated description thereof will be omitted here, and the embodiment of the disclosure will not be limited thereto. Reference can be made to the embodiment of the display panel above for an implementation of the display device, so a repeated description thereof will be omitted here.

In the method for driving a display panel according to the embodiment of the disclosure, the display panel includes: a first gate driver circuit, a second gate driver circuit, common electrodes in an array, data lines, and gate lines, where the gate lines include first gate lines and second gate lines arranged alternately row by row in the extension direction of the data lines, the first gate driver circuit is connected with the first gate lines, the first gate driver circuit and the second gate driver circuit output signals alternately, the second gate driver circuit is connected with the second gate lines, and the common electrodes are reused as touch electrodes; and one frame includes a first period and a second period, where in the first period, the first gate driver circuit provides a gate scan signal to the first gate lines row by row, and the second gate driver circuit provides an alternating-current touch scan signal to the second gate lines row by row; and in the second period, the first gate driver circuit provides the alternating-current touch scan signal to the first gate lines row by row, and the second gate driver circuit provides the gate scan signal to the second gate lines row by row, where the alternating-current touch scan signal is provided to the common electrodes, and data signals are provided to the data lines in the first period and the second period, and the alternating-current touch scan signal and the data signals are switched between the positive and negative polarities at the same frequency. The gate scan signal or the alternating-current touch scan signal is input to the first gate lines and the second gate lines in the different periods, so that a display function can be enabled, but also a touch report rate can be improved; and the alternating-current touch scan signal and the data signals are switched between the positive and negative polarities at the same frequency so that the alternating-current touch scan signal can be provided to the common electrodes all the time without being switched between a direct-current signal and an alternating-current signal, to thereby alleviate a touch function and the display function from affecting each other.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for driving a display panel, the display panel comprising: a first gate driver circuit, a second gate driver circuit, pixel units in an array, data lines, and gate lines, wherein each of the pixel units corresponds to a common electrode, the gate lines comprise first gate lines and second gate lines alternately row by row in an extension direction of the data lines, the first gate driver circuit is connected with the first gate lines, the second gate driver circuit is connected with the second gate lines, the first gate driver circuit and the second gate driver circuit output signals alternately, and common electrodes are reused as touch electrodes; and one frame comprises a first period and a second period, wherein the first gate lines are connected with pixel units of odd rows, the second gate lines are connected with pixel units of even rows; or, the first gate lines are connected with pixel units of even rows, the second gate lines are connected with pixel units of odd rows; wherein the method comprising:

in the first period, providing, by the first gate driver circuit, a gate scan signal to the first gate lines row by row, to enable display scanning in an area corresponding to the pixel units connected with the first gate lines, and providing, by the second gate driver circuit, an alternating-current touch scan signal to the second gate lines row by row, to enable touch scanning in an area corresponding to the pixel units connected with the second gate lines; and in the second period, providing, by the first gate driver circuit, the alternating-current touch scan signal to the first gate lines row by row, to enable touch scanning in the area corresponding to the pixel units connected with the first gate lines, and providing, by the second gate driver circuit, the gate scan signal to the second gate lines row by row, to enable display scanning in the area corresponding to the pixel units connected with the second gate lines;

wherein in the first period and in the second period, the alternating-current touch scan signal is provided to the common electrodes, and data signals are provided to the data lines, and the alternating-current touch scan signal and the data signals are switched between positive and negative polarities at a same frequency.

2. The method according to claim 1, wherein one frame further comprises a third period between the first period and the second period, the method further comprises:

in the third period, providing a first alternating-current touch signal to the first gate lines, the second gate lines, and the data lines, and providing a second alternating-current touch signal to the common electrodes.

3. The method according to claim 2, wherein one frame further comprises a fourth period after the second period, the method further comprises:
in the fourth period, providing the first alternating-current touch signal to the first gate lines, the second gate lines, and the data lines, and providing the second alternating-current touch signal to the common electrodes.

4. The method according to claim 3, wherein the second alternating-current touch signal provided to the common electrodes is different from the first alternating-current touch signal provided to the first gate lines, the second gate lines, and the data lines.

5. The method according to claim 4, wherein a frequency of the second alternating-current touch signal provided to the common electrodes is lower than a frequency of the first alternating-current touch signal provided to the first gate lines, the second gate lines, and the data lines.

6. The method according to claim 3, wherein in the third period and/or the fourth period, the second alternating-current touch signal provided to the common electrodes is the same as the first alternating-current touch signal provided to the first gate lines, the second gate lines, and the data lines.

7. A display panel, comprising:
a first gate driver circuit, a second gate driver circuit, pixel units in an array, data lines, and gate lines, wherein each of the pixel units corresponds to a common electrode the gate lines comprise first gate lines and second gate lines alternately row by row in an extension direction of the data lines, the first gate driver circuit is connected with the first gate lines, the second gate driver circuit is connected with the second gate lines, the first gate driver circuit and the second gate driver circuit output signals alternately, and common electrodes are reused as touch electrodes; wherein the first gate lines are connected with pixel units of odd rows, the second gate lines are connected with pixel units of even rows; or, the first gate lines are connected with pixel units of even rows, the second gate lines are connected with pixel units of odd rows;
wherein in a first period of one frame, the first gate driver circuit is configured to provide a gate scan signal to the first gate lines row by row, to enable display scanning in an area corresponding to pixel units connected with the first gate lines, and the second gate driver circuit is configured to provide an alternating-current touch scan signal to the second gate lines row by row, to enable touch scanning in an area corresponding to the pixel units connected with the second gate lines; and
in a second period of one frame, the first gate driver circuit is configured to provide the alternating-current touch scan signal to the first gate lines row by row, to enable touch scanning in the area corresponding to the pixel units connected with the first gate lines, and the second gate driver circuit is configured to provide the gate scan signal to the second gate lines row by row, to enable display scanning in the area corresponding to the pixel units connected with the second gate lines;
wherein in the first period and in the second period, the alternating-current touch scan signal is provided to the common electrodes, and data signals are provided to the data lines, and the alternating-current touch scan signal and the data signals are switched between positive and negative polarities at a same frequency.

8. The display panel according to claim 7, wherein the display panel is a light-emitting diode display panel comprising cathode layers in an array, the cathode layers being reused as the touch electrodes.

9. The display panel according to claim 7, wherein the display panel is a liquid crystal display panel comprising common electrode layers in an array, the common electrode layers being reused as the touch electrodes.

10. The display panel according to claim 9, wherein voltage differences between the alternating-current touch scan signal and two data signals provided to two adjacent data lines at a same instance of time are opposite in polarity.

11. A display device, comprising the display panel according to claim 7.

* * * * *

UNITED STATES PATENT AND TRADEMARK OFFICE
CERTIFICATE OF CORRECTION

PATENT NO. : 10,915,192 B2
APPLICATION NO. : 16/404893
DATED : February 9, 2021
INVENTOR(S) : Jingpeng Zhao Page 1 of 1

It is certified that error appears in the above-identified patent and that said Letters Patent is hereby corrected as shown below:

On the Title Page

(72) Inventor 7 Reads "Yanfei Yan"
Should Read --Yanfei Ren--

Signed and Sealed this
Sixth Day of April, 2021

Drew Hirshfeld
*Performing the Functions and Duties of the
Under Secretary of Commerce for Intellectual Property and
Director of the United States Patent and Trademark Office*